US008191363B2

(12) United States Patent
Laumer et al.

(10) Patent No.: US 8,191,363 B2
(45) Date of Patent: Jun. 5, 2012

(54) HYDRAULIC ACTUATOR CONTROL SYSTEM FOR REFUSE COLLECTION VEHICLE

(75) Inventors: Stephen P. Laumer, Maplewood, MN (US); Gary Lee Lagro, Rosemount, MN (US)

(73) Assignee: Hartfiel Automation, Inc., Eden Prairie, MN (US)

(*) Notice: Subject to any disclaimer, the term of this patent is extended or adjusted under 35 U.S.C. 154(b) by 984 days.

(21) Appl. No.: 12/179,637

(22) Filed: Jul. 25, 2008

(65) Prior Publication Data

US 2009/0025378 A1 Jan. 29, 2009

Related U.S. Application Data

(60) Provisional application No. 60/952,497, filed on Jul. 27, 2007.

(51) Int. Cl.
*F16D 31/02* (2006.01)
*F15B 13/044* (2006.01)

(52) U.S. Cl. .............................. 60/433; 91/459; 91/461

(58) Field of Classification Search .................... 60/388, 60/390, 392, 433; 91/459, 461; 74/471 XY
See application file for complete search history.

(56) References Cited

U.S. PATENT DOCUMENTS

| | | | |
|---|---|---|---|
| 3,572,529 A | 3/1971 | Anderson | |
| 4,954,776 A | 9/1990 | Husher | |
| 5,129,425 A | 7/1992 | Howarth et al. | |
| 5,138,838 A * | 8/1992 | Crosser | 60/433 |
| 5,344,273 A | 9/1994 | Radlein | |
| 5,505,576 A | 4/1996 | Sizemore et al. | |
| 5,784,944 A * | 7/1998 | Tozawa et al. | 91/459 |
| 6,963,796 B2 | 11/2005 | Larson et al. | |
| 7,831,352 B2 * | 11/2010 | Laumer et al. | 60/433 |
| 2003/0163230 A1 | 8/2003 | Pillar et al. | |
| 2003/0171854 A1 | 9/2003 | Pillar et al. | |
| 2004/0002794 A1 | 1/2004 | Pillar et al. | |
| 2005/0065684 A1 | 3/2005 | Larson et al. | |
| 2005/0234622 A1 | 10/2005 | Pillar et al. | |
| 2007/0061054 A1 | 3/2007 | Rowe et al. | |
| 2007/0173987 A1 | 7/2007 | Rowe et al. | |
| 2007/0185625 A1 | 8/2007 | Pillar et al. | |
| 2008/0004777 A1 | 1/2008 | Quigley | |

(Continued)

FOREIGN PATENT DOCUMENTS

DE 68912183 E 2/1994

(Continued)

OTHER PUBLICATIONS

"StreetForce News Release", www.businesswire.com May 31, 2002 , 1 page.

(Continued)

*Primary Examiner* — Michael Leslie

(74) *Attorney, Agent, or Firm* — Pauly, DeVries Smith & Deffner, L.L.C.

(57) ABSTRACT

A system for controlling motion of a hydraulic actuator on a refuse collection vehicle. The system includes an operator input device configured to produce a proportional electrical signal that is proportional to the degree of motion of the operator input device. The system further includes a proportional pneumatic control valve that is configured to produce a pressurized air control signal in proportion to the proportional electrical signal, and a hydraulic control valve that is configured to selectively control flow of hydraulic fluid to a hydraulic actuator in response to the pressurized air control signal.

19 Claims, 5 Drawing Sheets

U.S. PATENT DOCUMENTS

| | | | |
|---|---|---|---|
| 2008/0071429 | A1 | 3/2008 | Kraimer et al. |
| 2008/0109131 | A1 | 5/2008 | Pillar et al. |
| 2008/0114513 | A1 | 5/2008 | Pillar et al. |
| 2008/0140253 | A1 | 6/2008 | Brown |
| 2008/0215190 | A1 | 9/2008 | Pillar et al. |
| 2008/0221754 | A1 | 9/2008 | Rowe et al. |
| 2008/0228323 | A1 | 9/2008 | Laumer et al. |
| 2009/0306863 | A1 | 12/2009 | Curotto et al. |

FOREIGN PATENT DOCUMENTS

| | | | |
|---|---|---|---|
| EP | 63177 | A1 | 10/1982 |
| EP | 339759 | A | 11/1989 |
| EP | 339759 | B1 | 1/1994 |
| KR | 2008033194 | A | 4/2008 |

OTHER PUBLICATIONS

Gu et al., ""Multiplexed hydraulic valve actuation using ionic liquid filled soft channels and Braille displays"", *Applied Physics Letters; vol. 90, Issue 3, Digital Object Identifier: 10.1063/1.2431771*, 2007, pp. 033505-033505-3.

Jeong et al., ""Fabrication of all PDMS micro pump"", *Micro-NanoMechatronics and Human Science, 2005 IEEE International Symposium on: Digital Object Identifier: 10.1109/MHS.2005.1589977*, 2005, pp. 139-143.

Rosas-Flores et al., ""Optimal linearization of the dynamic behavior of an on/off actuated single pneumatic cylinder"", *Electrical Engineering, Computing Science and Automatic Control, 2008. CCE 2008. 5th International Conference on: Digital Object Identifier: 10.1109/ICEEE.2008.4723441*, 2008, pp. 380-385.

Sente et al., ""Control of a direct-drive servo-valve actuated by a linear amplified piezoelectric actuator for aeronautic applications"", *Electrical Machines, 2008. ICEM 2008. 18th International Conference on Digital Object Identifier: 10.1109/ICELMACH.2008.4800093*, 2008, pp. 1-6.

Situm et al., ""Design and control of a manipulator arm driven by pneumatic muscle actuators"", *Control and Automation, 2008 16th Mediterranean Conference on: Digital Object Identifier, 10.1109/MED.2008.4602136*, 2008, pp. 926-931.

Zhang et al., ""High stiffness pneumatic actuating scheme and improved position control strategy realization of a pneumatic climbing robot"", *Robotics and Biomimetics, 2008. ROBIO 2008. IEEE International Conference on: Digital Object Identifier: 20.1109/ROBIO.2009.4913276*, 2009, pp. 1806-1811.

Zibin et al., ""Height frequency electro-hydraulic vibration exciter with 2D valve"", *Systems and Control in Aerospace and Astronautics, 2008. ISSCAA 2008. 2nd International Symposium on: Digital Object Identifier:.10.1109/ISSCAA.2008.4776406*, 2008, pp. 1-4.

* cited by examiner

HYDRAULIC ACTUATOR CONTROL SYSTEM FOR REFUSE COLLECTION VEHICLE

RELATED APPLICATIONS

This application is a non-provisional application claiming priority to U.S. Provisional Application No. 60/952,497, filed Jul. 27, 2007, and the entire contents of the U.S. Provisional Application are incorporated herein by reference.

FIELD OF THE INVENTION

The invention relates to control systems for hydraulic actuators, and more particularly, to the control of hydraulic actuators by an operator.

BACKGROUND OF THE INVENTION

To increase the efficiency of refuse collection, many refuse collection companies use automated refuse loaders that lift a refuse container and then dump the refuse container into a refuse collection vehicle. Such automated refuse loaders can service a significantly higher number of customers in a given time period when compared with manually placing refuse into the refuse collection vehicle. This increased efficiency can result in substantially lower refuse collection costs. However, there are various challenges associated with the use of automated refuse loaders. For example, it is desired that the refuse loader mechanism operate as fast as possible to reduce cycle times and increase productivity.

Some refuse collection vehicles utilize an arm system that lifts the garbage container and then dumps the garbage container into a garbage truck. Such a mechanical arm systems may be mounted on the side of the garbage truck to permit garbage to be collected as the garbage truck is driving along a road. A garbage truck incorporating one such mechanical arm system is marketed by McNeilus under the designation STREETFORCE. Other types of arm systems may include front or rear loader systems that lift the garbage container from the front or the rear of the garbage truck.

In a common configuration, these mechanical arm systems include two primary components: a first arm portion that grasps the garbage container and a second arm portion that lifts the garbage container and dumps the garbage container into the garbage truck. However, other configurations are usable. Hydraulic actuators are generally used to provide for the motion of these mechanical arm systems. These hydraulic actuators are generally hydraulic cylinders, although there may be applications where hydraulic motors or other hydraulic rotary actuators are utilized.

Controls are generally provided within the operator's compartment of the refuse collection vehicle to allow the operator to control the motion of the arm system. In one typical arrangement, the hydraulic actuators are operated by a joystick that the operator moves when the operator intends to have the arm system move. The joysticks are each typically configured as pneumatic control valves, where a supply of pressurized air is supplied to the joysticks and movement of the joystick causes pressurized air to be transmitted through an appropriate channel of tubing. This pressurized air that is transmitted from the joystick is typically transmitted to a pneumatic actuator on a hydraulic control valve, where the air pressure acting on a piston or diaphragm causes a hydraulic control valve to move, which in turn causes pressurized hydraulic fluid to flow to the hydraulic actuator. This flow of pressurized hydraulic fluid causes the hydraulic actuator to operate. While the hydraulic system provides a high degree of reliability and relatively easy maintenance, there is typically a delay from when the pneumatic system is activated with the joystick until the hydraulic actuator is activated. Such delay reduces the productivity of the garbage collection process. Furthermore, this delay can reduce the tactile feel that the operator has for the operation of the mechanism.

Improved systems for controlling the motion of loader mechanisms on refuse collection vehicles are needed.

SUMMARY OF THE INVENTION

One aspect of the invention relates to a system for controlling motion of a hydraulic actuator on a refuse collection vehicle. The system includes an operator input device configured to produce a proportional electrical signal that is proportional to the degree of motion of the operator input device. The system further includes a proportional pneumatic control valve that is configured to produce a pressurized air control signal in proportion to the proportional electrical signal, and a hydraulic control valve that is configured to selectively control flow of hydraulic fluid to a hydraulic actuator in response to the pressurized air control signal.

Another aspect of the invention relates to a mobile refuse collection vehicle. The mobile refuse collection vehicle includes a source of pressurized hydraulic fluid and a source of pressurized air, a lifter apparatus configured to interface with a refuse container, a hydraulic actuator configured to move the lifter apparatus through a range of operation, and an operator input device that is configured to produce a proportional electrical signal that is proportional to the degree of motion of the operator input device and one or more digital signals that correspond to the direction of motion of the operator input device. The mobile refuse collection vehicle further includes a proportional pneumatic control valve that is configured to produce a pressurized air control signal from the source of pressurized air in response to the proportional electrical signal, and one or more pneumatic control valves that are configured to selectively transmit the pressurized air control signal to a pneumatic actuator in response to a digital signal. The mobile refuse collection vehicle also includes a hydraulic control valve that is configured to be selectively actuated by the pneumatic actuator to control flow of a hydraulic fluid from the source of pressurized fluid to a hydraulic actuator.

In another embodiment of the invention, a mobile refuse collection vehicle system includes similar elements, but has an operator input device that is configured to produce a proportional electrical signal that is proportional to the degree of motion of the operator input device and two or more directional digital signals that correspond to the direction of motion of the operator input device. The system further includes two or more pneumatic control valves that are configured to selectively transmit the pressurized air control signal to a pneumatic actuator in response to the directional signals, wherein each pneumatic control valve responds to one of the directional digital signals.

The invention may be more completely understood by considering the detailed description of various embodiments of the invention that follows in connection with the accompanying drawings.

Figure 1:
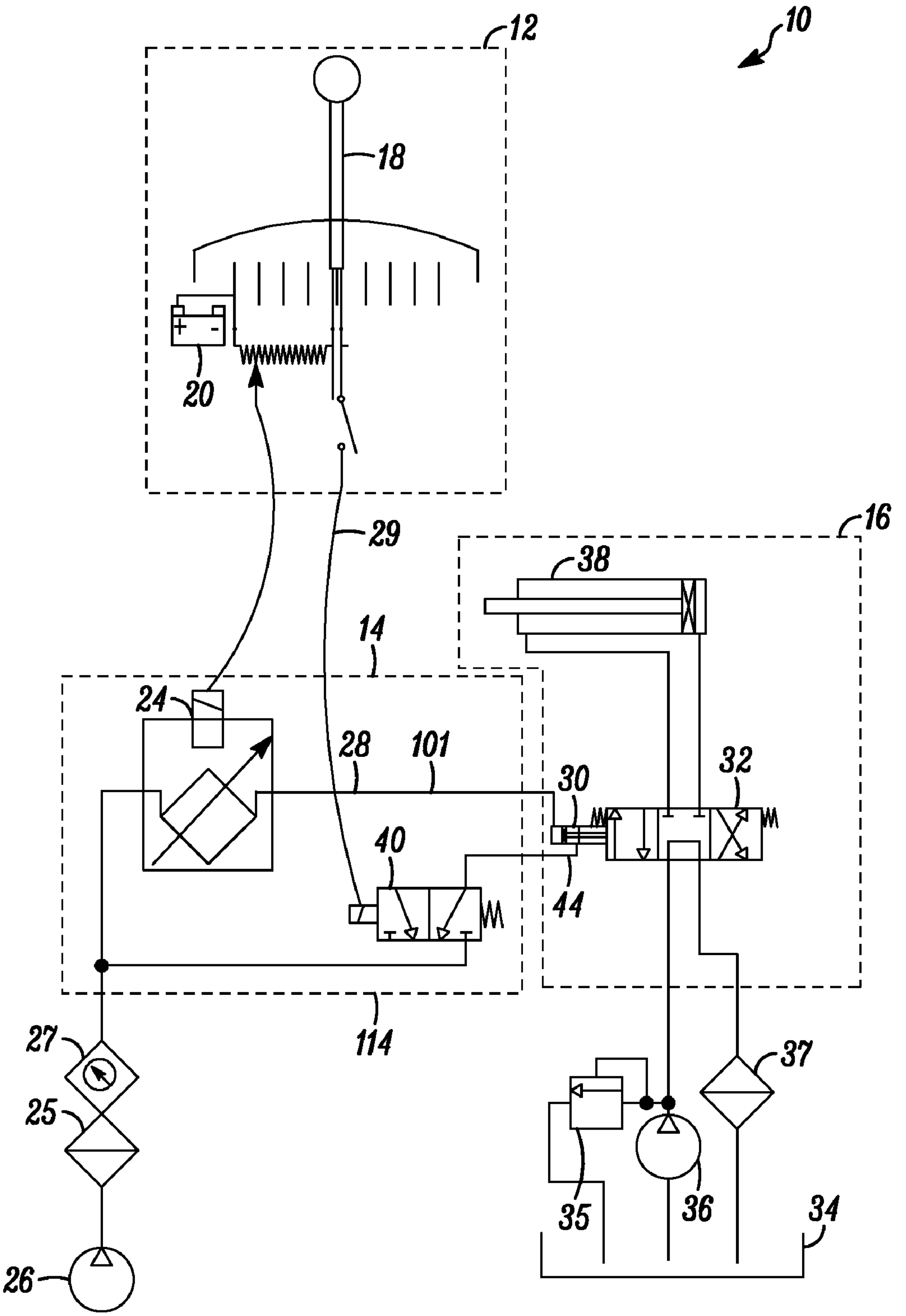
FIG. 1 is a schematic representation of a hydraulic actuator control system configured to control a single hydraulic actuator of a refuse collection vehicle.

While the invention may be modified in many ways, specifics have been shown by way of example in the drawings and will be described in detail. It should be understood, however, that the intention is not to limit the invention to the particular embodiments described. On the contrary, the intention is to cover all modifications, equivalents, and alternatives following within the scope and spirit of the invention as defined by the claims.

DETAILED DESCRIPTION OF THE INVENTION

In a typical configuration for controlling the motion of a hydraulic actuator, the pneumatic lines that connect the joystick or other operator control to the pneumatic actuator on a hydraulic control valve are relatively long. For example, these lines may be from 20 to 80 feet long. It has been found that these long lines are relatively slow to transmit a pneumatic pressure signal. This delay is believed to be the result of the compressibility of the air in the tubing lines and the finite speed of a transmission of a pressure wave through such a line containing air, as well as frictional forces causing restriction to flow. The delay increases the amount of time from when the operator inputs a command to the system and when the system completes the commanded action. This thereby increases the cycle times and reduces the efficiency of the process, as well as reducing the effectiveness of the operator by diminishing the operator's tactile feel for the operation of the mechanism.

Figure 2:
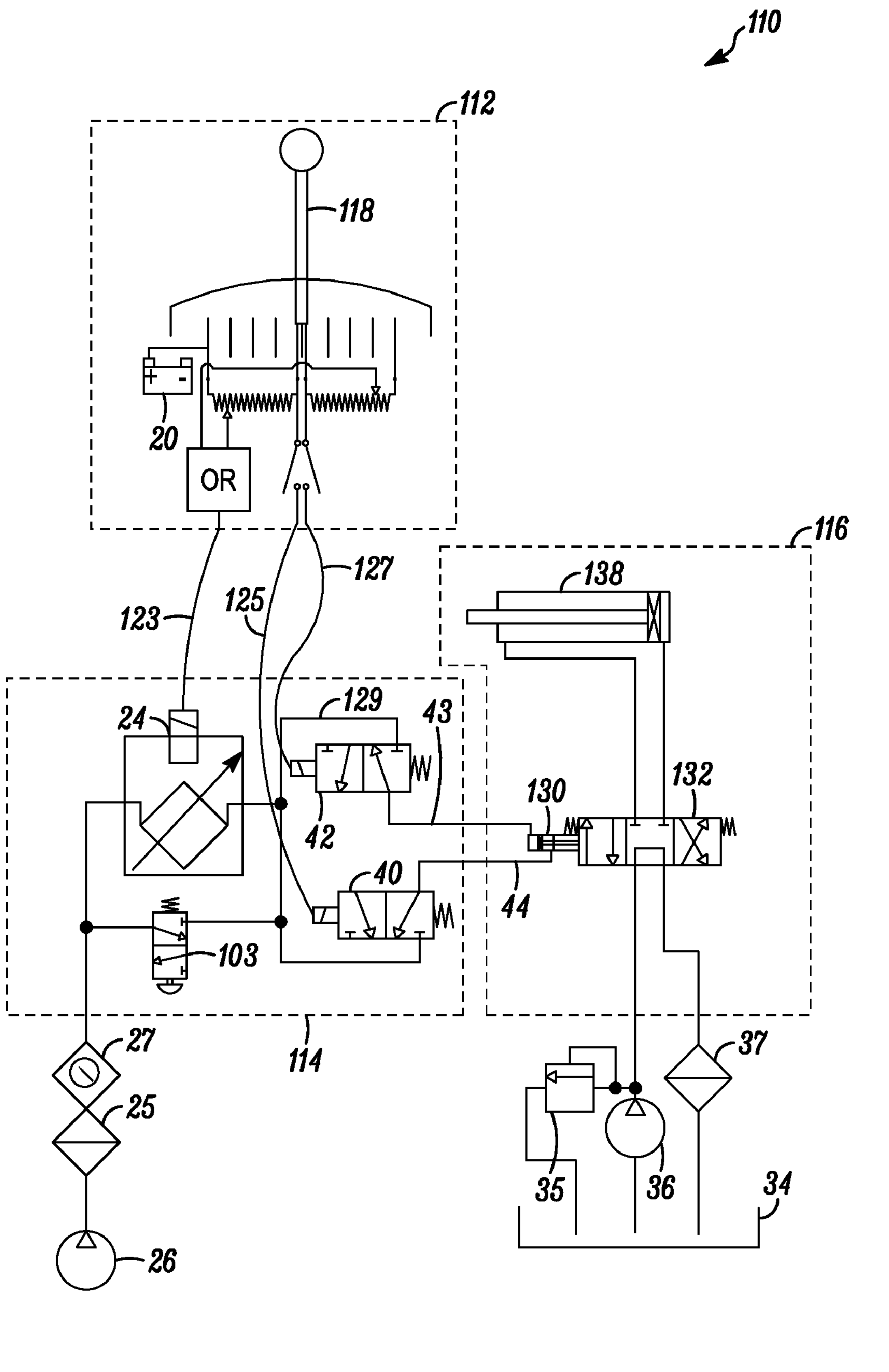
FIG. 2 is a schematic representation of a hydraulic actuator control system configured to control a hydraulic actuator in two directions of a refuse collection vehicle.
Figure 3:
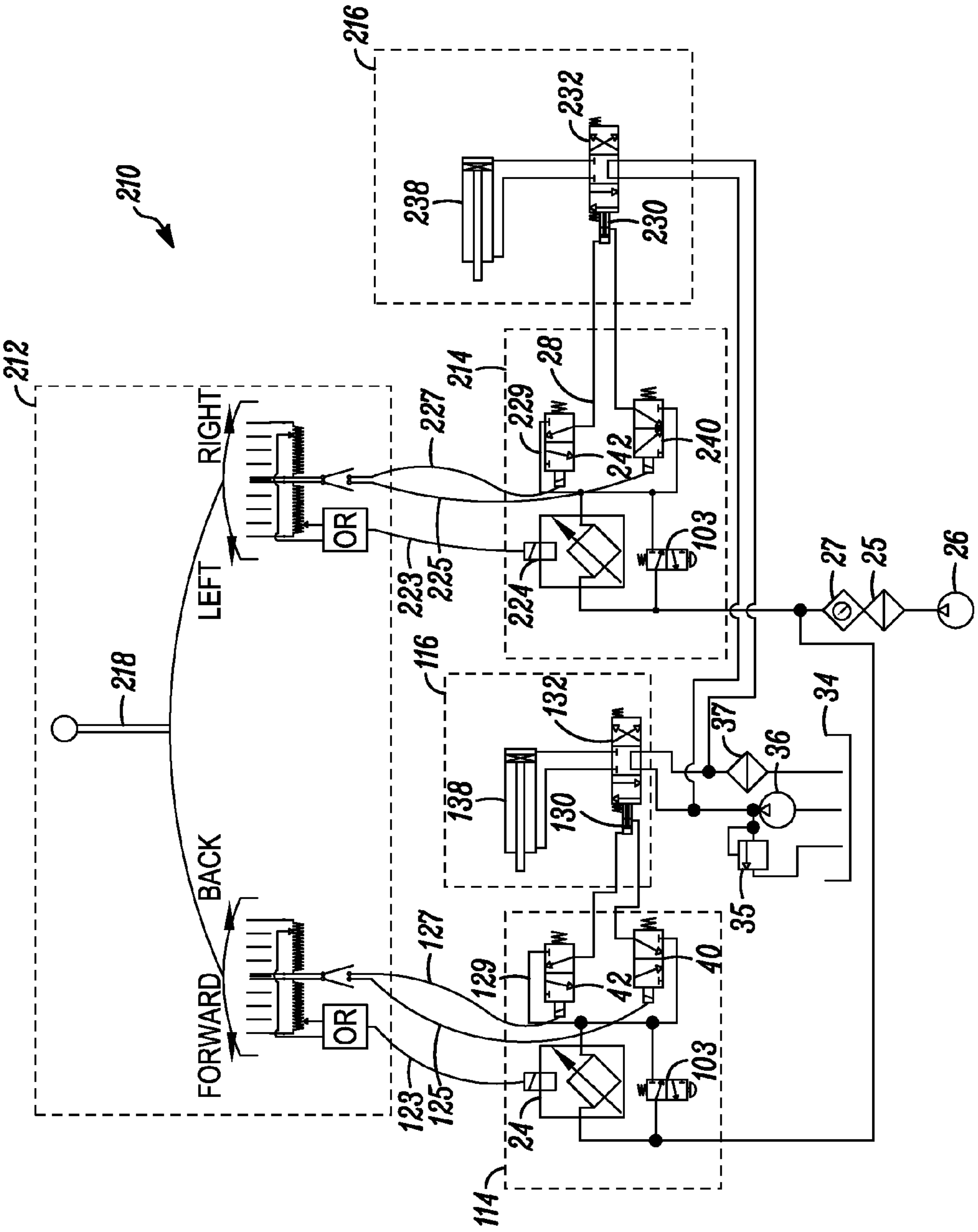
FIG. 3 is a schematic representation of a hydraulic actuator control system configured to control two hydraulic actuators of a refuse collection vehicle.

An embodiment of a control system 10 for a refuse collection vehicle is depicted in FIG. 1. The control system 10 includes an electronic control portion 12, a pneumatic control portion 14, and a hydraulic control portion 16. The electronic control portion 12 includes an operator input device 18 and an electrical power source 20. The operator input device 18 may be configured to operate one, two, or more functions of a loader mechanism. For example, an operator input device 18 may be configured to control a boom raise function, or may be configured to control both a boom raise and dump function. By way of further example, an input device 18 may be configured to control both boom raise and lower functions as well as a dump and return function. Many other usable configurations for an operator input device 18 are possible. FIG. 1 depicts control of only one function or movement by an operator input device 18, such as would be used to control the extension or retraction of a hydraulic cylinder using the operator input device, while the movement of the hydraulic cylinder in the opposite direction is simply an on-off function. However, the system of FIG. 1 could be modified to control motion in both directions, as is shown in FIG. 2 and described below, and to control multiple hydraulic actuators, as is shown in FIG. 3 and described below. Furthermore, more than one input device 18 may be provided to control any number of functions and their associated multiple components, as will be discussed below.

Operator input device 18 is configured to produce at least one proportional electrical signal representative of the operator's actuation of the input device 18. For example, the operator input device 18 may be a joystick device that receives a constant input voltage, such as 12.0 volts from electrical power source 20, and produces a signal having a voltage that is proportional to the degree to which the operator has moved the input device 18. The input device 18 may be, for example, a potentiometer (i.e., a variable resistor) or a Hall Effect type device that uses a non-contact sensor to derive an output signal. The proportional electrical signal may vary, for example, from 0.0 volts (i.e., high resistance in the potentiometer of the input device) in a neutral position of the input device 18, to about 2.5 volts to 4.0 at an actuation position just beyond the neutral position, to 6.5 volts at a middle actuation position, up to 10.0 volts at a full actuation (i.e., low resistance in the potentiometer of the input device). In one embodiment, the proportional electrical signal may be linearly related to the position of the operator input device 18, and in another embodiment, the proportional electrical signal is non-linear within a small range near the neutral position and linear at other actuation positions of the operator input device 18. This characteristic may be referred to as proportional control.

An air compressor 26 is provided and connected to pneumatic control portion 14 for producing a flow of pressurized air. This pressurized air is passed through a filter 25 and a regulator 27, and is then supplied to a pneumatic proportional pressure controller 24 that is configured to receive the proportional electric control signal from operator input device 18 and to produce a pneumatic pressure within downstream line 28 that is proportional to the input provided by the operator. Pneumatic proportional pressure controller 24 may also be referred to as a voltage-to-pressure device, as is familiar to those of skill in the art. In operation, when the operator actuates the input device 18 a relatively small amount in a first direction, such as to the left in FIG. 1, the proportional electric control signal will cause pneumatic proportional pressure controller 24 to produce a relatively low pressure within line 28. However, when the operator actuates the input device 18 a relatively large amount in the first direction, the proportional electric control signal will cause pneumatic proportional pressure controller 24 to produce a relatively high pressure within line 28.

When operator input device 18 is in a neutral position, pneumatic proportional pressure controller 24 produces a zero pressure or vent of line 28.

Operator input device 18 is further configured to produce a digital signal on wire 29 that indicates if the operator input device 18 is moved in a second direction, such as to the right in FIG. 1. Wire 29 is connected to a pneumatic control valve 40 which operates the return function if the operator input device is moved in a second direction. The pneumatic control valve 40 is a two-position valve that is spring-biased to a closed position in which air cannot pass from an inlet port to an outlet port, and the outlet port is connected to the vent position. For example, in one embodiment, if the operator input device is being manipulated in the second direction by the operator, then a signal travels down 29. If the operator input device 18 is in a neutral position, then no signal travels down wire 29 to the pneumatic control valve 40. For example, when operator input device 18 is actuated in the second direction, a digital control signal is generated that is transmitted to pneumatic control valve 40, causing control valve 40 to shift against spring-biasing pressure and to allow pressurized air to pass through from the input port to the outlet port, and blocking the vent port.

In the embodiment of FIG. 1, pneumatic pressure within line 28 is transmitted to a pneumatic actuator 30 on hydraulic control valve 32 within hydraulic control portion 16. The hydraulic control portion 16 further includes a hydraulic reservoir 34 that contains hydraulic fluid, such as oil, and a hydraulic pump 36 that produces a flow of hydraulic fluid out of reservoir 34 and to hydraulic control valve 32. A hydraulic filter 37 is also provided. In the depicted embodiment, hydraulic control valve 32 is an open center valve; however, other types of valves are usable, such as a closed center valve. A relief valve 35 is typically provided in the system to prevent over pressurization.

When a flow of pressurized air exists within pneumatic line 28, this pressure acts on a piston or diaphragm within pneumatic actuator 30, causing a force to be applied to hydraulic control valve 32 that is opposite to the spring force holding the valve in the neutral position. This force acts in the opposite direction to the centering spring force and tends to move the valve to a position that allows hydraulic fluid from the pump to flow through the hydraulic control valve 32 and to the hydraulic actuator 38, such as a hydraulic cylinder. In the example of FIG. 1, the hydraulic control valve 32 is moved to the right when the operator input device is moved away from a neutral position. The amount that the control valve is moved is a function of the pneumatic pressure acting on the pneumatic actuator 30, and the amount that the control valve moves will affect the flow rate of hydraulic fluid through the valve. Lower hydraulic flow rates are associated with a smaller movement of the hydraulic control valve 32 and will result in lower actuation speeds of the hydraulic actuator 38, and likewise higher hydraulic flow rates will result in higher actuation speeds of the hydraulic actuator 38.

In the example embodiment shown in FIG. 1, hydraulic control valve 32 is configured to transmit hydraulic oil to the rod end of a hydraulic cylinder 38 when the operator input device is moved. At the same time that pressurized oil is provided to the rod end of the hydraulic cylinder, the head end of the hydraulic cylinder is fluidly connected to the reservoir 34 through passages in hydraulic control valve 32. This allows the hydraulic cylinder to move in a rod-in direction.

When the air pressure within line 28 drops to or near zero as a result of the operator returning the input device 18 to the neutral position, the force generated by pneumatic actuator 30 on hydraulic control valve 32 is diminished. Also, when the operator input device is in a return cylinder position, a signal is received at pneumatic control valve 40 on wire 29, causing the pneumatic control valve 40 to open to allow air pressure in the downstream line 44 to reach the pneumatic actuator 30. The air pressure in the line 44 is not modulated by the pneumatic proportional pressure controller 24. As a result, the pneumatic actuator 30 is acted upon by the pressure in the downstream line 44, and so a force is applied to the piston or diaphragm within pneumatic actuator 30, thereby causing a force to be applied to hydraulic control valve 32 that is opposite the force applied when the operator control device is being moved. For example, the hydraulic control valve is moved to the left when the operator input device is in a return cylinder position. This moves the valve to a position that allows fluid from the pump 37 to flow to the piston side of the cylinder 38, so that the valve is moved to a rod-out position.

The example of FIG. 1 includes a hydraulic cylinder, but other types of hydraulic actuators can be used with the hydraulic control systems described herein. In place of a hydraulic cylinder, a hydraulic rotary actuator may be used. For example, a helical rotary hydraulic actuator is useable, such as a helical sliding spline actuator available from Helac Corporation of Enumclaw, Wash.

FIG. 2 depicts a control system 110 that is similar to the control system 10 of FIG. 1, but it is further configured to control more than one function or control the movement in more than one direction. For example, control system 110 may be configured to control both a cylinder extend operation and a cylinder retract operation. The control system 110 includes an electronic control portion 112, a pneumatic control portion 114, and a hydraulic control portion 116. Some elements of control system 110 are identical to elements in control system 10 and share identical reference numbers.

Electronic control portion 112 includes an operator input device 118 that is configured with at least two degrees of motion to provide at least two separate input commands from the operator. For example, operator input device 118 may be configured to have a neutral position, a first degree of input when the input device 118 is moved in one direction away from the neutral position, and a second degree of input when the input device 118 is moved in an opposite direction away from the neutral position. The operator input device 118 is configured to provide a proportional electrical signal that represents the amount that the device is moved away from the neutral position. In one embodiment, this proportional electrical signal does not indicate which direction the input device 118 is moved, only the amount that it is moved away from neutral. Circuitry may be provided within input device 118 to produce such a signal. The proportional electrical signal is transmitted along wire 123 to proportional pneumatic controller 24, which operates the same as describe above in association with FIG. 1. Operator input device 118 is further configured to produce two digital direction signals that correspond to the direction in which operator input device 118 is moved. For example, when operator input device 118 is moved in a first direction, such as to the left in FIG. 2, a digital signal may be transmitted along wire 125, and when operator input device 118 is moved in a second direction, such as to the right in FIG. 2, a digital signal may be transmitted along wire 127.

Digital signals transmitted along wires 125, 127 are received at electromechanical actuators on pneumatic control valves 40, 42, respectively. Each of pneumatic control valves 40, 42 is a two-position valve that is spring-biased to a closed position in which air cannot pass from an inlet port to an outlet port, and the outlet port is connected to the vent position. The inlet port of both of the pneumatic control valves 40, 42 is fluidly connected to pressure manifold 129, located downstream of proportional pneumatic controller 24, and the outlet ports are fluidly connected to pneumatic actuator 130. The electromechanical actuators of pneumatic valves 40, 42 are configured to control the position of the valve in response to the digital signal. For example, when operator input device 118 is actuated in one direction, a digital control signal is generated that is transmitted to pneumatic control valve 40, causing control valve 40 to shift against spring-biasing pressure and to allow pressurized air to pass through from the input port to the outlet port, and blocking the vent port. Likewise, if operator input device 118 is actuated in the other direction, a digital control signal is transmitted to pneumatic control valve 42, causing control valve 42 to shift against spring-biasing pressure and allow pressurized air to pass through to the outlet port, and blocking the vent port.

Also depicted in FIG. 2 is a manual actuation valve 103. This optional valve is to be used in a situation where the electronic controls have failed and temporary back-up control is required. Manual actuation valve 103 allows a user to manually direct pressurized air to pneumatic actuator 30, causing hydraulic control valve 32 to be actuated. This manual actuation valve is typically only used in emergencies because it does not allow for precise control and because it is typically not positioned in a convenient location for use by the operator. However, it does allow certain "limp home" functionality by allowing the operator to reposition or stow the refuse collection mechanism following a failure, thereby allowing the truck to be driven to a repair facility.

In operation of the system of FIG. 2, when the operator moves the input device 118 in one direction, such as to the left in FIG. 2, two signals are generated. A first signal is the proportional control signal that corresponds to the distance that the control is moved from the neutral position. This signal is transmitted along wire 123 to proportional pneumatic controller 24, where it controls the air pressure in downstream manifold 129. At the same time, a digital signal is generated and transmitted through wire 125 that corresponds to the direction in which the control device 118 is moved. This signal is transmitted to control valve 40, where it causes control valve 40 to open and to connect manifold 129 with pneumatic actuator 130. The pressure acting on pneumatic actuator 130 in turn shifts hydraulic control valve 132 to the left and causes hydraulic fluid to flow from pump 36 to the rod end of double acting cylinder 138. This causes the cylinder to retract.

Likewise, if the operator moves the input device 118 in an opposite direction, such as to the right in FIG. 2, two signals are again generated. The first signal, the proportional control signal, also corresponds to the distance that the control is moved from the neutral position, and again controls proportional pneumatic controller 24. A digital signal is generated and transmitted through wire 127 that corresponds to the direction that input device 118 is moved. This signal is transmitted to control valve 42, where it causes control valve 42 to open and to connect manifold 129 with pneumatic actuator 130. This in turn shifts hydraulic control valve 132 to the right and causes hydraulic fluid to flow from pump 36 to the head end of double acting cylinder 138. This causes the cylinder to extend.

The system of FIG. 2 could readily be configured to also provide for control of additional functions, such as a second set of hydraulic actuators. This would require duplicating the components shown in FIG. 2 as necessary to achieve the desired degree of functional control. FIG. 3 provides one example of a control system 210 that is similar to the control system of FIG. 2, but two hydraulic actuators are controlled, each being controllable in two directions. Some elements of control system 210 are identical to elements in control system 110 and share identical reference numbers.

The control system 210 of FIG. 3 includes an electronic control portion 212, two pneumatic control portions 114 and 214, and two hydraulic control portions 116 and 216. The electronic control portion 212 includes an operator input device 218 that allows control of both of the hydraulic control portions 116 and 216. For example, the operator input device 218 may allow movement forward and back to control the first hydraulic control portion 116 and movement to the left and right to control the second hydraulic control portion 216. In another embodiment, the operator input device may allow movement forward and backward, and may provide another lever or trigger for being squeezed or released.

The operator input device 218 is configured to provide a proportional electrical signal that represents the amount that the device is moved away from the neutral position. In one embodiment, this proportional electrical signal does not indicate which direction the input device 218 is moved, only the amount that it is moved away from neutral. Circuitry may be provided within input device 218 to produce such a signal. The proportional electrical signal is transmitted along wire 123 to proportional pneumatic controller 24, or along wire 223 to proportional pneumatic controller 224. The pneumatic controllers 24, 224 operate the same as describe above in association with FIGS. 1 and 2.

Operator input device 218 is further configured to produce four digital direction signals that correspond to the direction in which operator input device 218 is moved. For example, when operator input device 218 is moved in a first direction, such as forward in FIG. 3, a digital signal may be transmitted along wire 125, and when operator input device 118 is moved in a second direction, such as back in FIG. 3, a digital signal may be transmitted along wire 127. Similarly, when the operator input device 212 is moved to the left in FIG. 3, a digital signal is transmitted along wire 225 and when the operator input device 212 is moved to the right in FIG. 3, a digital signal is transmitted along wire 227.

The pneumatic control portions 114 and 214 have components that are identical to those in pneumatic control portion 114 as described in relation to FIG. 2, including pneumatic pressure controller 24, 224, and pneumatic control valves 40, 42, 240 and 242.

The system 210 also has two hydraulic control portions 116, 216 are identical to the hydraulic control portion 116 described in relation to FIG. 2, including a pneumatic actuator 130, 230, a hydraulic control valve 132, 232, and a hydraulic actuator 138, 238.

Hydraulic fluid is provided to both hydraulic control portions 116 and 216 by the same hydraulic pump 36 that produces a flow of hydraulic fluid out of reservoir 34 to hydraulic control valves 132 and 232. A hydraulic filter 37 and a relief valve 35 are also provided.

An air compressor 26 is provided and connected to both pneumatic control portion 114 and to pneumatic control portion 214 for producing a flow of pressurized air. This pressurized air is passed through a filter 25 and a regulator 27, and is then supplied to a pneumatic proportional pressure controllers 124 and 224 that are each configured to receive a proportional electric control signal from operator input device 218 and to produce a pneumatic pressure within downstream lines 129 and 229 that is proportional to the input provided by the operator. It will be appreciated that a control system such as control system 210 may be modified to provide control for additional functions by providing additional pneumatic control portions and additional hydraulic control portions.

Utilizing the control system 10 described herein reduces delays experienced by pneumatic systems on prior art garbage trucks by, in some embodiments, 1 second per activation/deactivation of hydraulic cylinder. In the process of handling a single garbage container, there are typically at least eight activations/deactivations of the hydraulic cylinders on the automated loading system. Automated side loading garbage trucks may handle more than 1,000 garbage containers in a single business day depending on a variety of factors such as the size of the garbage containers and the proximity of the garbage containers on the route serviced by the garbage truck. In view of the large number of garbage containers that are handled by the garbage trucks, reducing delays associated with handling each garbage container can significantly increase the number of garbage containers that are handled in the business day.

While control systems such as control systems 10, 110, 210 include more components than control systems that directly connect pneumatic controls or electronic controls to a hydraulic control valve for hydraulic cylinders, the control systems 10, 110, 210 achieve significant advantages. Control systems using pneumatic controls attached to hydraulic cylinders experience delays between activating the pneumatic control and operation of the associated hydraulic cylinder because of the distance between the pneumatic control and the hydraulic control valve. Furthermore, troubleshooting control systems in which electronic controls are directly connected to the hydraulic control valve often requires diagnostic equipment that is expensive and can be challenging to operate correctly. However, the control systems disclosed herein are relatively simple to maintain and troubleshoot. For example, if a particular function of a refuse collection vehicle ceases operating properly, a service person can simply disconnect one or more of the pneumatic control lines to feel for the presence of pressurized air as part of a diagnostic process. Furthermore, diagnostic aids may be provided on the pneumatic components, such as a light that indicates the presence of air pressure.

The operator input device may be one of a variety of configurations depending on the environment in which the control system is utilized. For example, when the hydraulic control system is used in conjunction with a garbage truck, the operator input device may consist of one joystick. For garbage trucks that include an automated side loader, the operator input device may include two joysticks. One of the joysticks may be utilized for gripping the garbage container and the other joystick may be utilized for lifting and dumping the garbage container into the garbage truck.

Unlike controls that are conventionally used on garbage trucks, which are pneumatically operated, the operator input device used in conjunction with the control system is electronically controlled. A variety of electronically controlled joysticks may be used in conjunction with the control system and such electronically controlled joysticks may be analog or digital. The input device is operably connected to the other portions of the control system. The electronic control portion may include a plurality of wires that are encased in a cover. Depending on the desired use application, shielding may be provided over at least a portion of the wires to reduce the potential of interference from the other components of the device in which the control system is located from impacting the operation of the control system.

The electronic control portion may be relatively long so that the pneumatic control portion may be located in relatively close proximity to the hydraulic cylinders to which the pneumatic control portion is attached. When the control system is used in conjunction with a garbage truck having a front pivoting cab and a rear pivoting garbage receptacle, a distance between the operator input device and the hydraulic control valve may exceed 80 feet. While there are delays associated with using relatively long pneumatic tubes in conjunction with the pneumatic control system because of the time associated for the air pressure to move through the pneumatic tubes, the delays are minimized when the pneumatic tubes have a length of less than 10 feet and are negligible when the pneumatic tubes have a length of less than 5 feet. The pneumatic valves are positioned relatively close to the hydraulic valve. For example, when the control system is used in conjunction with an automated side loading garbage truck, the pneumatic valves 40, 42 may be located within 5 feet of the associated hydraulic valve. In some embodiments, this distance may be less than 10 feet, and in other embodiments this distance may be less than 15 feet. In this way, the control signal is transmitted nearly instantaneously through the electronic control portion, and is transmitted with only a negligible delay through the pneumatic control portion, thereby rendering the entire delay period negligible and reducing overall cycle time.

A refuse collection vehicle may be constructed having a hydraulic control system constructed as disclosed herein. For example, FIG. 3 is a side view of a front loading refuse collection vehicle 300 in which a hydraulic actuator control system according to the principles of the present invention may be utilized. The front loading vehicle 300 includes a front loader mechanism 302 that is moved by a hydraulic cylinder 304 and pivots about a pivot point 306.

The front loading mechanism 302 travels through a range of motion to lift a garbage container, such as a dumpster, from a first position on the ground in front of the front loading vehicle. As the front loading mechanism 302 rotates about the pivot point 306, the garbage container is carried along with the motion of the front loading mechanism to a second position where the container is upside-down above a hopper opening of the vehicle. The second position of the front loading mechanism is shown in FIG. 3, although the container is not shown.

Figure 4:
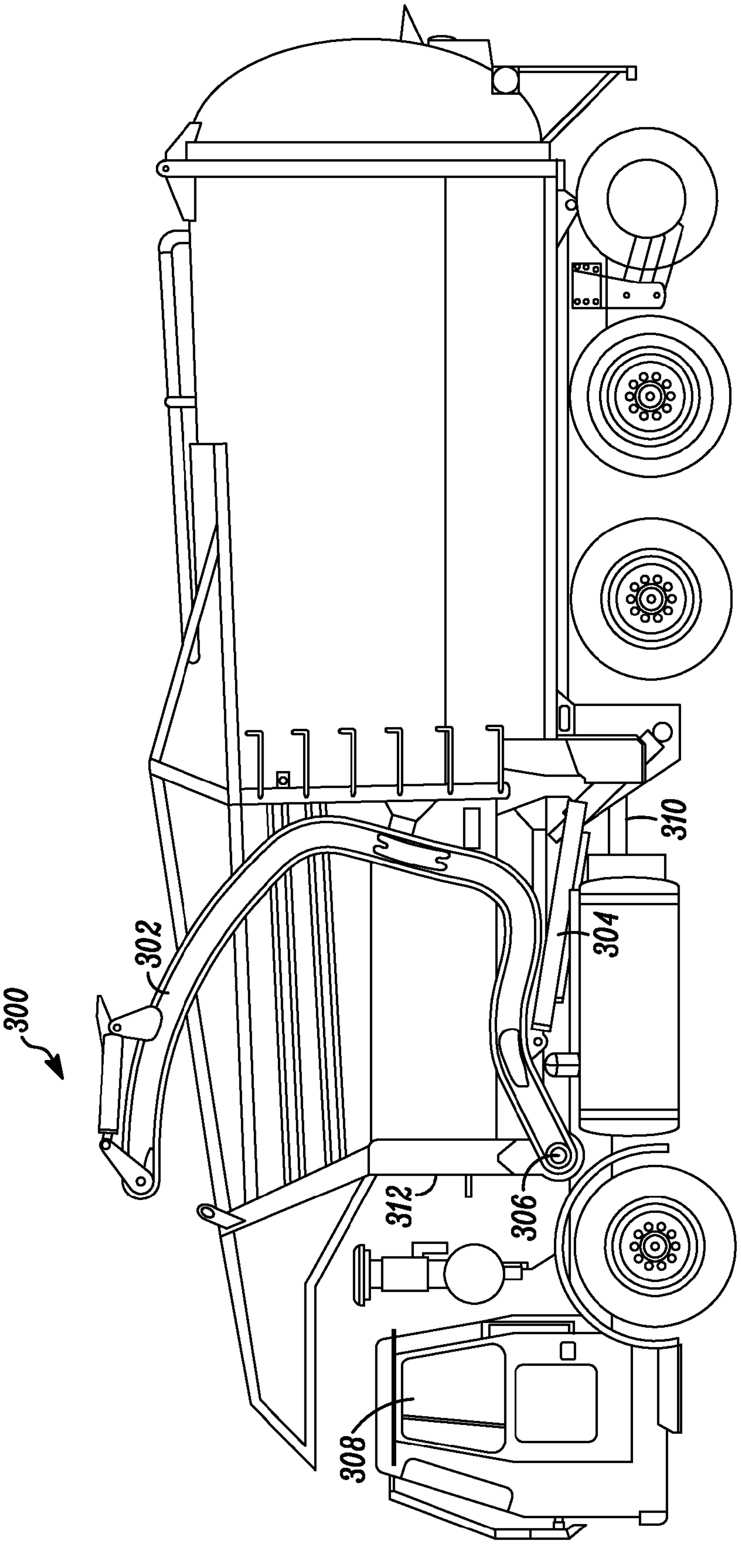
FIG. 4 is a side view of a front-loading refuse collection vehicle in which a hydraulic actuator control system according to the principles of the present invention is utilized.

Now referring to both FIG. 2 and FIG. 4, one embodiment of the locations of various components in FIG. 2 will be discussed on the refuse collection vehicle of FIG. 4. The operator input device or joystick 118 may be located in the driver's cab 308 of the vehicle 300. The hydraulic cylinder 138 of FIG. 2 is equivalent to the hydraulic cylinder 304 of FIG. 3. The pneumatic control portion may be located at a number of different locations between the driver's cab 308 and the hydraulic cylinder 304, such as under on the vehicle chassis 310 or on a front surface 312 of the hopper. The electrical wires 123, 125 and 127 will connect the operator input device 118 in the driver's cab 308 with the pneumatic control portion.

Figure 5:
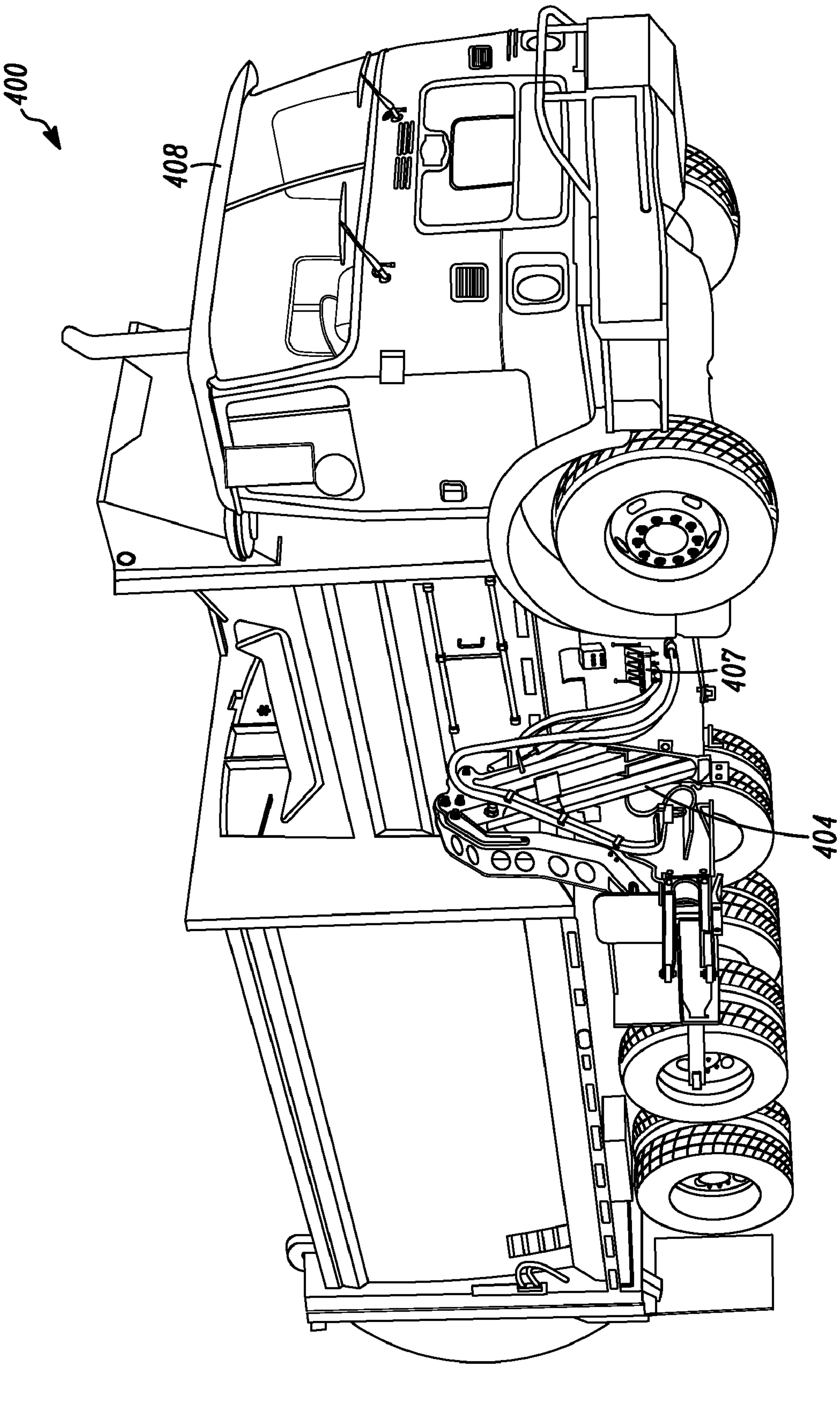
FIG. 5 is a side view of a side-loading refuse collection vehicle in which a hydraulic actuator control system according to the principles of the present invention is utilized.

Now referring to both FIG. 2 and FIG. 5, another embodiment of the locations of various components in FIG. 2 will be discussed on the refuse collection vehicle 400 of FIG. 5. The operator input device or joystick 118 may be located in the driver's cab 408 of the vehicle 400. The hydraulic cylinder 138 of FIG. 2 is equivalent to the hydraulic cylinder 404 of FIG. 5. The pneumatic control portion may be located at a number of different locations between the driver's cab 408 and the hydraulic cylinder 404, such as on the vehicle chassis 407 or on a front surface of the hopper. The electrical wires 123, 125 and 127 will connect the operator input device 118 in the driver's cab 408 with the pneumatic control portion. The hydraulic control systems disclosed herein are also applicable to a number of other types of vehicles and refuse loading vehicles, including side-loading refuse vehicles and side-loading recycling vehicles.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The above specification provides a complete description of the structure and use of the invention. Since many of the embodiments of the invention can be made without parting from the spirit and scope of the invention, the invention resides in the claims.

What is claimed is:

1. A system for controlling motion of a hydraulic actuator on a refuse collection vehicle, the system comprising:

(i) an operator input device configured to produce a proportional electrical signal that is proportional to the degree of motion of the operator input device;

(ii) a proportional pneumatic control valve configured to produce a pressurized air control signal in proportion to the proportional electrical signal; and (iii) a hydraulic control valve configured to selectively control flow of hydraulic fluid to a hydraulic actuator in response to the pressurized air control signal.

2. The system of claim 1, where the proportional pneumatic control valve increases the pressure of a supply of pressurized air in proportion to the proportional electrical signal.

3. The system of claim 1 where the hydraulic control valve has a centering spring to spring-bias the hydraulic control valve to a neutral position in which no hydraulic fluid flows to the hydraulic actuator.

4. The system of claim 3 where the hydraulic control valve further comprises a pneumatic actuator configured to move the hydraulic control valve in response to the pressurized air control signal.

5. The system of claim 4 where air pressure acting on the pneumatic actuator causes the hydraulic control valve to move against the force acting on the hydraulic control valve from the centering spring, and where the distance the hydraulic control valve moves is proportional to the pressurized air control signal.

6. The system of claim 1, where the operator input device is further configured to produce two or more digital signals that correspond to the direction of motion of the operator input device.

7. The system of claim 6, further comprising a plurality of pneumatic control valves, where each pneumatic control valve is configured to operate in response to one of the digital signals produced by the operator input device.

8. The system of claim 7, where each pneumatic control valve receives pressurized air from the proportional pneumatic control valve and selectively transmits pressurized air to a pneumatic actuator on the hydraulic control valve.

9. The system of claim 1, further comprising a fluid passageway for transmitting pressurized air from the proportional pneumatic control valve to the hydraulic control valve.

10. The system of claim 9, where the length of the fluid passageway is less than 15 feet.

11. The system of claim 9, where the length of the fluid passageway is less than 10 feet.

12. The system of claim 9, where the length of the fluid passageway is less than 5 feet.

13. A mobile refuse collection vehicle system comprising:

(i) a source of pressurized hydraulic fluid and a source of pressurized air;

(ii) a lifter apparatus configured to interface with a refuse container;

(iii) a hydraulic actuator configured to move the lifter apparatus through a range of operation;

(iv) an operator input device configured to produce a proportional electrical signal that is proportional to the degree of motion of the operator input device and one or more digital signals that correspond to the direction of motion of the operator input device;

(v) a proportional pneumatic control valve configured to produce a pressurized air control signal from the source of pressurized air in response to the proportional electrical signal;

(vi) one or more pneumatic control valves that are configured to selectively transmit the pressurized air control signal to a pneumatic actuator in response to a digital signal; and (vii) a hydraulic control valve configured to be selectively actuated by the pneumatic actuator to control flow of a hydraulic fluid from the source of pressurized hydraulic fluid to a hydraulic actuator.

14. The system of claim 13 where the hydraulic control valve has a centering spring to spring-bias the hydraulic control valve to a neutral position in which no hydraulic fluid flows to the hydraulic actuator.

15. The system of claim 14 where air pressure acting on the pneumatic actuator causes the hydraulic control valve to move against the force acting on the hydraulic control valve from the centering spring, and where the distance the hydraulic control valve moves is proportional to the pressurized air control signal.

16. The system of claim 13, further comprising a fluid passageway for transmitting pressurized air from the proportional pneumatic control valve to the hydraulic control valve.

17. The system of claim 16, where the length of the fluid passageway is less than 5 feet.

18. The system of claim 16, where the length of the fluid passageway is less than 10 feet.

19. A mobile refuse collection vehicle system comprising:

(i) a source of pressurized hydraulic fluid and a source of pressurized air;

(ii) a lifter apparatus configured to interface with a refuse container;

(iii) a hydraulic actuator configured to move the lifter apparatus through a range of operation;

(iv) an operator input device configured to produce a proportional electrical signal that is proportional to the degree of motion of the operator input device and two or more directional digital signals that correspond to the direction of motion of the operator input device;

(v) a proportional pneumatic control valve configured to produce a pressurized air control signal from the source of pressurized air in response to the proportional electrical signal;

(vi) two or more pneumatic control valves that are configured to selectively transmit the pressurized air control signal to a pneumatic actuator in response to the directional signals, wherein each pneumatic control valve responds to one of the directional digital signals; and (vii) a hydraulic control valve configured to be selectively actuated by the pneumatic actuator to control flow of a hydraulic fluid from the source of pressurized hydraulic fluid to a hydraulic actuator.

* * * * *